United States Patent
Lutz (10) Patent No.: US 12,147,219 B2
(45) Date of Patent: Nov. 19, 2024

(54) CONTROL SYSTEM AND OPERATOR SERVER FOR ESTABLISHING DEPENDENCIES BETWEEN PROCESS OBJECTS

(71) Applicant: Siemens Aktiengesellschaft, Munich (DE)

(72) Inventor: Benjamin Lutz, Pfinztal (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/608,920

(22) PCT Filed: May 6, 2020

(86) PCT No.: PCT/EP2020/062604
§ 371 (c)(1),
(2) Date: Nov. 4, 2021

(87) PCT Pub. No.: WO2020/225316
PCT Pub. Date: Nov. 12, 2020

(65) Prior Publication Data
US 2022/0197257 A1   Jun. 23, 2022

(30) Foreign Application Priority Data

May 7, 2019   (EP) .................................... 19173091

(51) Int. Cl.
G05B 19/418   (2006.01)
(52) U.S. Cl.
CPC ............. *G05B 19/4183* (2013.01); *G05B 2219/31472* (2013.01)

(58) Field of Classification Search
CPC .................................................. G05B 19/4183
(Continued)

(56) References Cited

U.S. PATENT DOCUMENTS

2007/0265713 A1   11/2007   Veillette et al.
2008/0244449 A1   10/2008   Morrison et al.
(Continued)

FOREIGN PATENT DOCUMENTS

CN   101681161        3/2010
CN   103502900 A *   1/2014   ........... G05B 19/042
(Continued)

OTHER PUBLICATIONS

PCT International Search Report dated Jul. 6, 2020 based on PCT/EP2020/062604 filed May 6, 2020.
(Continued)

*Primary Examiner* — Hien D Khuu
(74) *Attorney, Agent, or Firm* — Cozen O'Connor (57) ABSTRACT

An operator station server of a control system of a process engineering plant, wherein the server includes a computer-implemented process image that has, for a runtime of the process engineering plant, at least one first computer-implemented process object and a second computer-implemented process object which are each associated with a technical object of the process engineering plant and are operatively connected to same, where two associated technical objects are operatively connected within the process engineering plant, and where the first process object has a reference to the second process object.

6 Claims, 5 Drawing Sheets

(58) Field of Classification Search
USPC .......................................................... 700/83
See application file for complete search history.

(56) References Cited

U.S. PATENT DOCUMENTS

| | | | | |
|---|---|---|---|---|
| 2009/0282067 A1* | 11/2009 | Bendigeri | ............ | G05B 19/042 717/136 |
| 2013/0055122 A1* | 2/2013 | Turnaus | .................... | G06F 8/36 715/764 |
| 2014/0100668 A1 | 4/2014 | Jundt et al. | | |
| 2014/0100676 A1* | 4/2014 | Scott | ...................... | G05B 15/02 700/83 |
| 2014/0258916 A1* | 9/2014 | Laycock | ............ | G05B 23/0216 715/781 |
| 2016/0266566 A1* | 9/2016 | Lutz | ..................... | G05B 19/056 |
| 2017/0023932 A1* | 1/2017 | Drumm | .................. | G06F 30/20 |
| 2017/0228589 A1* | 8/2017 | Parapurath | ............ | G06V 30/413 |
| 2018/0004949 A1* | 1/2018 | Lutz | ...................... | G06F 21/554 |
| 2018/0039261 A1 | 2/2018 | Haller et al. | | |
| 2018/0314222 A1* | 11/2018 | Hoernicke | ......... | G05B 19/0426 |
| 2018/0314239 A1* | 11/2018 | Lutz | ................... | G05B 19/4188 |
| 2019/0171196 A1* | 6/2019 | Lutz | .................... | G05B 23/0272 |
| 2019/0303516 A1* | 10/2019 | Haller | ................... | G05B 17/02 |

FOREIGN PATENT DOCUMENTS

| | | | | |
|---|---|---|---|---|
| CN | 104838324 | | 8/2015 | |
| EP | 2360542 A1 * | | 8/2011 | ......... G05B 19/4183 |
| EP | 3151217 | | 4/2017 | |
| EP | 3361341 | | 8/2018 | |
| JP | 6367052 B2 * | | 8/2018 | ............. G05B 17/02 |

OTHER PUBLICATIONS

EP Search Report dated Sep. 27, 2019 based on EP19173091 filed May 7, 2019.

* cited by examiner

CONTROL SYSTEM AND OPERATOR SERVER FOR ESTABLISHING DEPENDENCIES BETWEEN PROCESS OBJECTS

CROSS-REFERENCE TO RELATED APPLICATIONS

This is a U.S. national stage of application No. PCT/EP2020/062604 filed 6 May 2020. Priority is claimed on European Application No. 19173091.0 filed 7 May 2019, the content of which is incorporated herein by reference in its entirety.

BACKGROUND OF THE INVENTION

1. Field of the Invention

The invention relates to a control system for a process engineering plant and an operator station server of the control system of the process engineering plant.

2. Description of the Related Art

Figure 1:
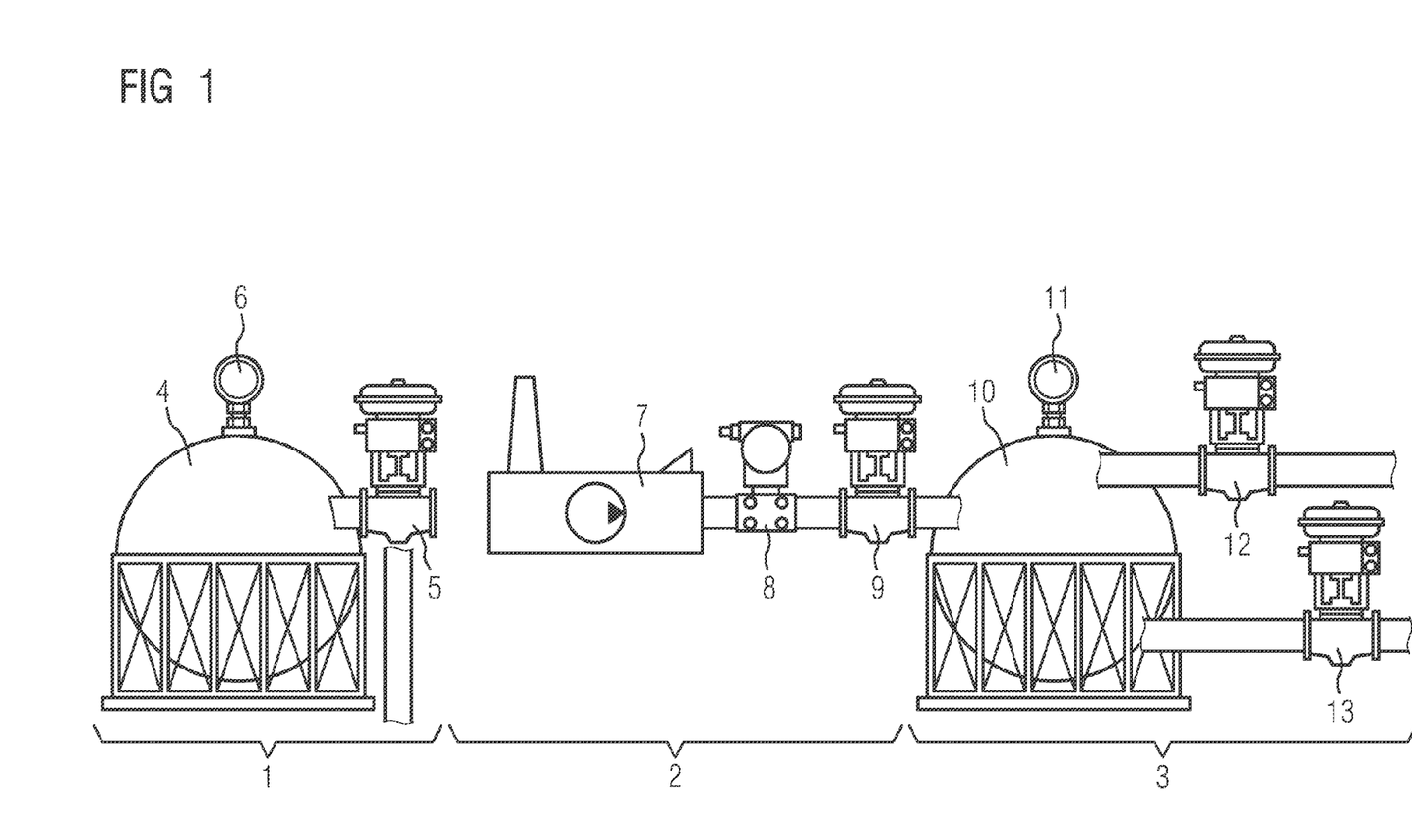
FIG. 1 shows a block diagram of a simplified extract of a conventional process engineering plant for storing and distributing gas.

FIG. 1 shows a simplified extract of a process engineering plant for storing and distributing gas. The plant is divided into three subsystems 1, 2, 3. The first subsystem 1 has a first pressure chamber 4 and a first discharge valve 5 connected thereto. In addition, the first pressure chamber 4 has a first pressure sensor 6. The second subsystem comprises a compressor 7, which is connected to an inlet valve 9 via a first flow sensor 8. The third subsystem 3 has a second pressure chamber 10 connected to the inlet valve 9. The second pressure chamber 10 has a second pressure sensor 11 and is connected to a second discharge valve 12 and a third discharge valve 13.

All the technical objects 4-13 of the plant shown are automated by various process objects of a control system controlling the plant. For example, the compressor 7 can be assigned a process object "engine control", the inlet valve 9 a process object "inlet valve regulation", etc.

The illustrated technical objects 4, 5, 6 of the first subsystem 1 and the technical objects 7, 8, 9, 10, 11, 12, 13 of the second and third subsystems 2, 3 are each located on a "process engineering string", i.e., they are directly dependent on one another or have operative connections with one another.

The process-related dependency is directly related to the alarm management between the process objects (due to an error in the compressor, the flow rate is reduced, there is a pressure drop, etc.). Symbolic system images are created for operating and monitoring process engineering plants that represent the process engineering relationships in an abstract manner. Due to their complexity, system images often have to be greatly simplified, so that the process engineering relationship is often lost, which makes it difficult to evaluate the cause of an alarm surge.

SUMMARY OF THE INVENTION

It is an object of the invention to provide an apparatus for operating and observing a process engineering plant, which makes it faster and more efficient to find alarm causes and alarm dependencies between different process objects of a process engineering plant, without the need for additional analysis tools, such as message sequence displays.

This and other objects and advantages achieved in accordance with the invention by a control system for a process engineering plant and an operator station server of the control system of the process engineering plant, in particular a manufacturing or processing plant, where the operator station server in accordance with the invention of the control system of the process engineering plant has a computer-implemented process image, where the computer-implemented process image comprises, at runtime of the process engineering plant, at least one first computer-implemented process object and one second computer-implemented process object that are each assigned to a technical object of the process engineering plant and are operatively connected to the same, and where the two assigned technical objects are operatively connected within the process engineering plant. The operator station server is characterized in that the first process object has a reference to the second process object.

The process engineering plant can be a plant from the process industry, such as a chemical, pharmaceutical, petrochemical plant, or a plant from the food and beverage industry.

These plants each have a control system or at least one computer-assisted module for controlling and regulating the process underway or production. In the present context, a control system is understood to be computer-assisted technical system that comprises functionalities for representing, operating, and conducting a technical system, such as a production plant. In the present case, the control system comprises sensors for determining measured values as well as various actuators. In addition, the control system comprises "process or production-related components" that serve to control the actuators or sensors. Furthermore, the control system has, inter alia, devices for visualizing the technical plant and for engineering. In addition, the term control system also includes further computing units for more complex regulation and systems for data storage and processing.

A technical object can be individual sensors or actuators of the process engineering plant. However, a technical object can also be a combination of a plurality of sensors and/or actuators, such as a motor, a reactor, a pump, or a valve system.

In accordance with the present disclosure, an "operator station server" is understood to mean a server that centrally records data from an operating and monitoring system and, as a rule, alarm, and measured value archives from a process control system of a process engineering plant and makes these available to users. The operator station server generally establishes a communication connection to automation systems of the process engineering plant and forwards data from the process engineering plant to so-called operator station clients, which serve to operate and monitor the operation of the individual functional elements of the process engineering plant. The operator station server can, without being limited thereto, be a SIMATIC PCS 7 Industrial Workstation Server from SIEMENS.

The operator station server has a process image, i.e., a current state of the technical objects of the process engineering plant is stored on the server at runtime of the system. The process image comprises at least one first computer-implemented process object and one second computer-implemented process object.

In accordance with the invention, the (first and second) process objects in the process image of the operator station server references are expanded in order to be able to relate the different process objects of the process engineering plant to an image of a process engineering string of the plant at runtime.

Here, the reference is a structured and direction-oriented reference to another process object. The values of the structured reference can be derived in an engineering phase, for example, from CFC plans (Continuous Functional Chart) or tabular relation matrices, and integrated into the configuration of the operator station server.

The operator station server in accordance with the invention can dynamically determine information relating to process engineering strings between the individual process objects at runtime of the process engineering plant and to forward it to any downstream device for operation and monitoring.

In the context of a preferred embodiment of the invention, information is stored in the operator station server about the type of operative connection between the two technical objects assigned to the first and second process objects. The operative connection between a first and a second tank (as technical objects) can be, for example, that a fluid can flow from the first tank into the second tank.

In addition to the reference to the second process object, the first process object preferably has further references to further process objects, where the process objects are each assigned to a technical object of the process engineering plant and are operatively connected thereto, where the technical objects assigned to the further process objects are in operative connection with the technical object assigned to the first process object, and where information regarding how many references the first process object has to the further process objects is assigned to the first process object.

The operator station server can be connected to an operator station client, where the operator station client is configured to receive visualization information from the operator station server during runtime of the process engineering plant to visually represent at least the first and the second process object and the operative connection between the two technical objects assigned to the first and second process object as symbolic system images.

The operator station server can thus determine the dependency from the process objects of the symbols present in a system image, i.e., the process engineering string.

Particularly preferably, the operator station server has an operator station client, where the operator station client is configured to receive visualization information from the operator station server during runtime of the process engineering plant to visually represent at least the first and the second process object and the operative connection between the two technical objects assigned to the first and second process object in the form of symbolic system images, and where the operator station client is configured, during the runtime of the technical plant, to generate at least one first visual representation that comprises at least one symbolic system image belonging to the first process object, and one second visual representation that comprises at least one symbolic system image belonging to the second process object, where the first visual representation has a display reference to the second visual representation, and the second visual representation has a display reference to the first visual representation, and where an operator of the process engineering plant can alternate between a display of the two visual representations visual representations by selecting the respective display reference.

An operator is understood to mean a human operator of the process engineering plant. The operator interacts with the technical plant or its control system via special user interfaces and controls special technical functions of the plant. For this purpose, the operator can use an operating and monitoring system of the control system.

With the "image change buttons" dynamically created at runtime of the plant, the operator can navigate along the derived process engineering string from system image to system image in order, for example, to identify the cause of an alarm surge or the like in a rapid and efficient manner.

The phrase "known to the control system" means that information about the respective data structure types is known to the control system, or more precisely a visualization service of the control system, to enable the transmission of this information to a connected operator station client for graphical presentation.

It is also an object of the invention to provide a control system for a process engineering plant which has at least one operator station server in accordance with the disclosed embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention, as well as the manner in which they are achieved, will become clearer and more clearly understandable in connection with the following description of the exemplary embodiment, which is explained in more detail in connection with the drawings, in which.

DETAILED DESCRIPTION OF THE EXEMPLARY EMBODIMENTS

Figure 2:
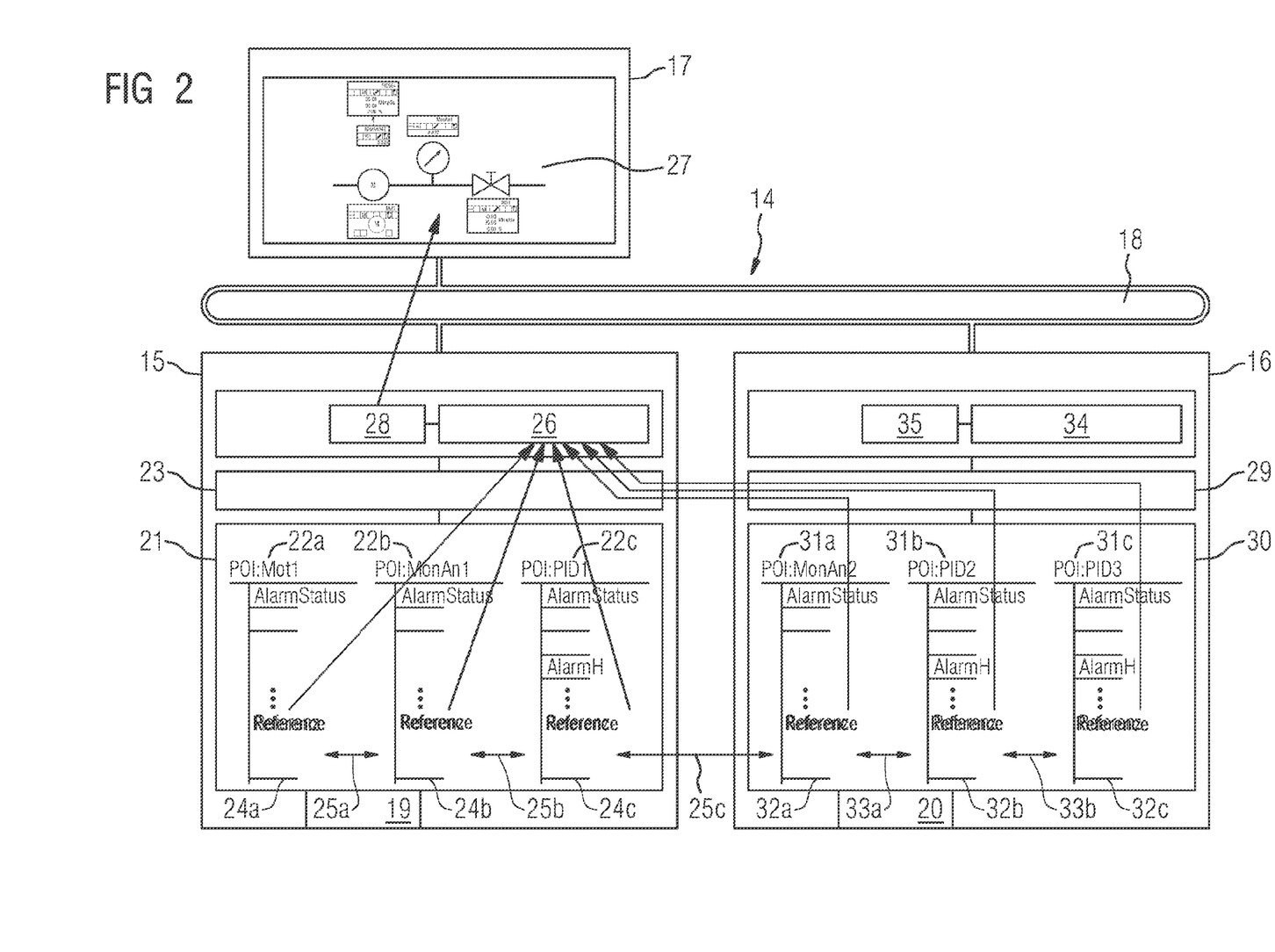
FIG. 2 shows a block diagram of control system in accordance with the invention.

FIG. 2 shows a part of a control system 14 of a technical plant configured as a process engineering plant in accordance with the invention. The control system 14 comprises a first server of an operating system or an operator station server 15 and a second operator station server 16. In addition, the control system has an operator station client 17.

The first operator station server 15, the second operator station server 16 and the operator station client 17 are connected to one another via a terminal bus 18 and to further components of the control system 14 (not shown) such as an engineering system server or a process data archive.

A user or operator has access to the first operator station server 15 and to the second operator station server 16 via the operator station client 17 via the terminal bus 18 in the context of operating and monitoring. The terminal bus 18 can, without being limited thereto, for example, be formed as an Industrial Ethernet.

The first operator station server 15 has a first device interface 19, which can be connected to a system bus (not shown). In this way, the first operator station server 15 can communicate with an (external) device or an application, in particular a web application. Analogously to this, the second operator station server 16 has a second device interface 20, which can likewise be connected to a system bus (not shown).

The first operator station server 15 has a first computer-implemented process image 21, in which process values received at runtime of the process engineering plant are stored. Furthermore, the first operator station server 15 comprises a visualization service 23 for outputting visualization information to the operator station client 17.

In the process image 21, the process values are assigned to various computer-implemented process objects 22a, 22b, 22c. The computer-implemented process objects 22a, 22b, 22c are each assigned to a technical object of the process engineering plant and are accordingly operatively connected therewith. This means that, for example, sensor values that arise in the assigned technical object are mapped in the associated process object 22a, 22b, 22c. The process objects 22a, 22b, 22c are provided with the designations "POI: Mot1", "POI:MonAn1" and "POI:PID1" in FIG. 2. Each process object 22a, 22b, 22c has a number of assigned parameters which are referred to in FIG. 2 as "AlarmStatus", "PV_Out", "SP_Out" etc.

Each process object 22a, 22b, 22c has a structured and direction-oriented reference 24a, 24b, 24c, which is referred to in FIG. 2 as "Dependency Tag Struct". The values of the structured "Dependency Tag" references 24a, 24b, 24c are derived from CFC plans in the engineering phase and accordingly loaded into the configurations of the first operator station server 15. Each structured and direction-oriented "Dependency Tag" reference 24a, 24b, 24c in the process image 21 of the first operator station server 15 has the following contents:

A reference to a dependent process object 22a, 22b, 22c (symbolized in FIG. 2 by double arrows 25a, 25b, 25c). The expression "dependent" means that the assigned technical objects are operatively connected within the process engineering plant (for example, "inlet opening" and "pressure chamber"). The type of operative connection between the process objects 22a, 22b, 22c is likewise stored in the operator station server 15.

A definition of the "left" or "right" dependency along a process engineering string of the process engineering plant.

Number of references to "left" or "right" along the process engineering string.

From the information stored in the process image 21, the visualization service 23 generates (inter alia) a symbolic system image 27 that is transmitted to the operator station client 17 for visualization. A first software component 26 of the visualization service 23 uses the references 24a, 24b, 24c to determine a dependency on block symbols generated from the process objects 22a, 22b, 22c in the symbolic system image 27(in order, so to speak, to derive the process engineering string for the system image 27). A second software component 28 of the visualization service 23 (a "Screen Object Model" (SOM)) is used to generate the block symbols for the process objects 22a, 22b, 22c for display in the system image 27.

The first software component 26 calculates the entire process engineering string, i.e., process objects 22a, 22b, 22c are also included in the calculation of the string, of which no block symbols are displayed in the currently displayed system image 27. If the process engineering string contains process objects 22a, 22b, 22c, the block symbols of which are not present in the current system image 27, then the system images 27 in which they are present are determined for those process objects 22a, 22b, 22c.

For determined system images 27, group alarms are calculated and updated for the process objects 22a, 22b, 22c concerned (i.e., their block symbols are shown in the respective system image 27). With the system images 27 and group alarms determined, "screen change buttons" can then be dynamically created in the currently opened system image 27 at runtime in order to be able to navigate from system image 27 to system image 27 along the derived process engineering string. This aspect is illustrated even more clearly in FIGS. 3-7.

The second operator station server 16, analogously to the first operator station server 15, has a second computer-implemented process image 30 in which process values received at runtime of the process engineering plant are stored. Furthermore, the second operator station server 16 comprises a visualization service 29 for outputting visualization information to the operator station client 17.

In the process image 30, the process values are assigned to various computer-implemented process objects 31a, 31b, 31c. The computer-implemented process objects 31a, 31b, 31c are each assigned to a technical object of the process engineering plant and are accordingly operatively connected thereto. The process objects 31a, 31b, 31c are provided with the designations "POI:MonAn2", "POI:PID2" and "POI: PID3" in FIG. 2. Each process object 31a, 31b, 31c has a number of assigned parameters which are referred to in FIG. 2 as "AlarmStatus".

Each process object 31a, 31b, 31c has a structured and direction-oriented reference 32a, 32b, 32c which is referred to in FIG. 2 as "reference" (The dependency is indicated by double arrows 33a, 33b, 24c). It can be seen in FIG. 2 that the references 24a, 24b, 24c, 32a, 32b, 32c (here indicated by the double arrow 24c) can also refer to process objects 22a, 22b, 22c, 31a, 31b, 31c which are stored in a process image 21, 30 of another operator station server 15, 16.

In a manner analogous to the first operator station server 15, the visualization service 29 of the second operator station server 16 has a first software component 34 and a second software component 35.

Figure 3:
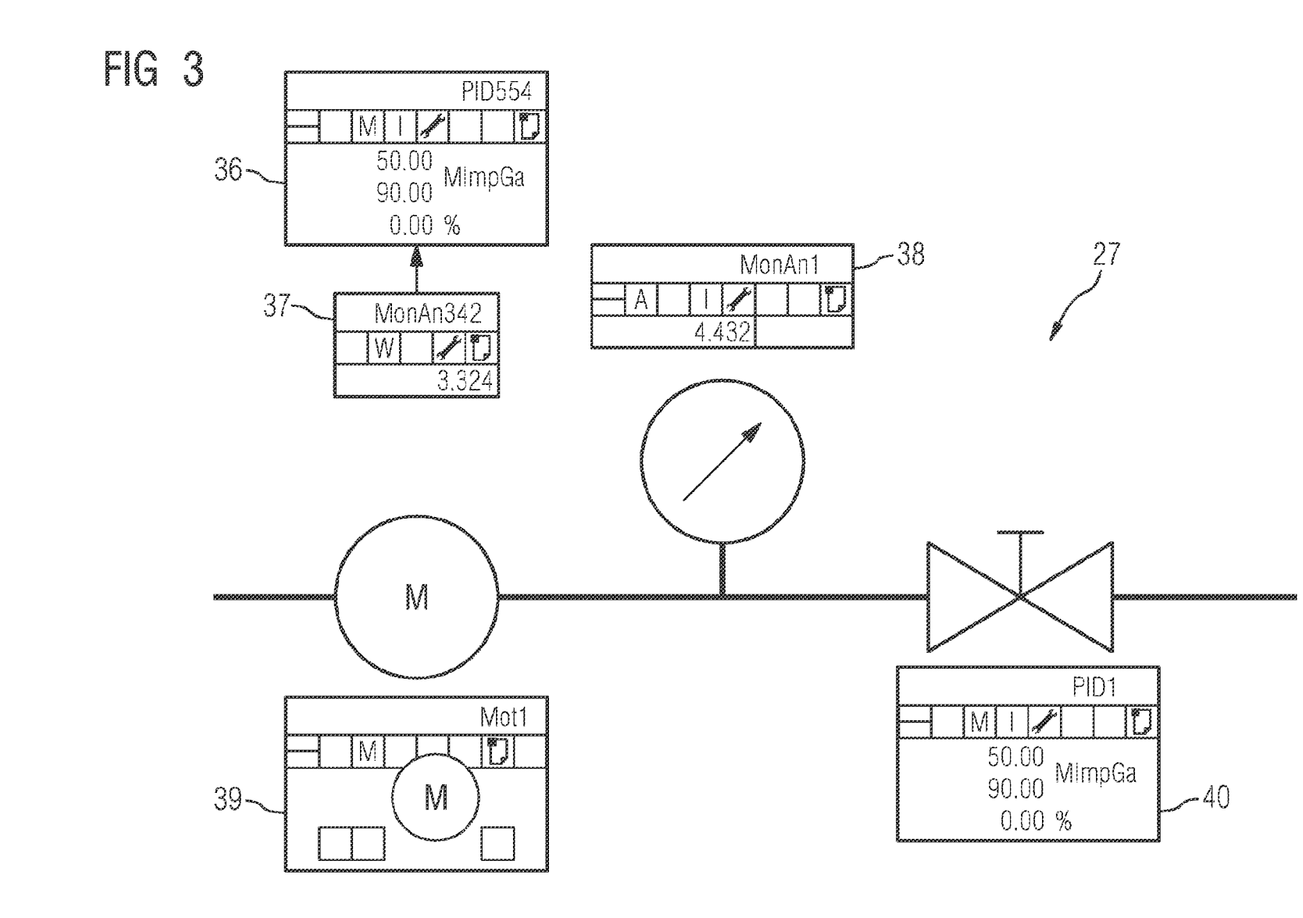
FIG. 3 shows a first system image of a process engineering plant in accordance with the invention.

FIG. 3 shows an exemplary system image 27 of the first subsystem 1 and the second subsystem 2 from FIG. 1 with block symbols 36, 37, 38, 39, 40 that relate to the technical objects of the first subsystem 1 and the second subsystem 2 from FIG. 1. A first block symbol 36 corresponds to the first discharge valve 5, a second block symbol 37 corresponds to the first pressure sensor 6, a third block symbol 38 corresponds to the flow sensor 8, a fourth block symbol 39 corresponds to the compressor 7 and a fifth block symbol 40 corresponds to the inlet valve 9.

FIG. 3 also shows symbolic representations of the compressor 7 ("M"), the flow sensor 8 ("arrow") and the inlet valve 9 ("valve") which, however, do not provide any information about a process engineering relationship of the process engineering dependencies underlying the block symbols 36, 37, 38, 39, 40.

It can be seen in FIG. 3 that the two block symbols 37, 38 visualize alarms of the associated process object.

If the dependency between the process objects does not emerge directly from the system image (above all if this dependency is cross system-image) an operator of the process engineering plant can use the presently disclosed dynamic determination and visualization of the dependencies of process objects in system images at runtime. For this purpose, he selects, for example, one of the block symbols 38, 39, 40 (alarming or not) with a key combination (the result can be seen in FIG. 4). The dependency determined by the first software component 26 ("DCS Domain Logic") between the technical objects underlying the block symbols 36, 37, 38, 39, 40 was dynamically used via the second software component 27 of the first operator station server 15 to expand the system image 27 in order to identify the process engineering string underlying the selected block symbol.

Figure 4:
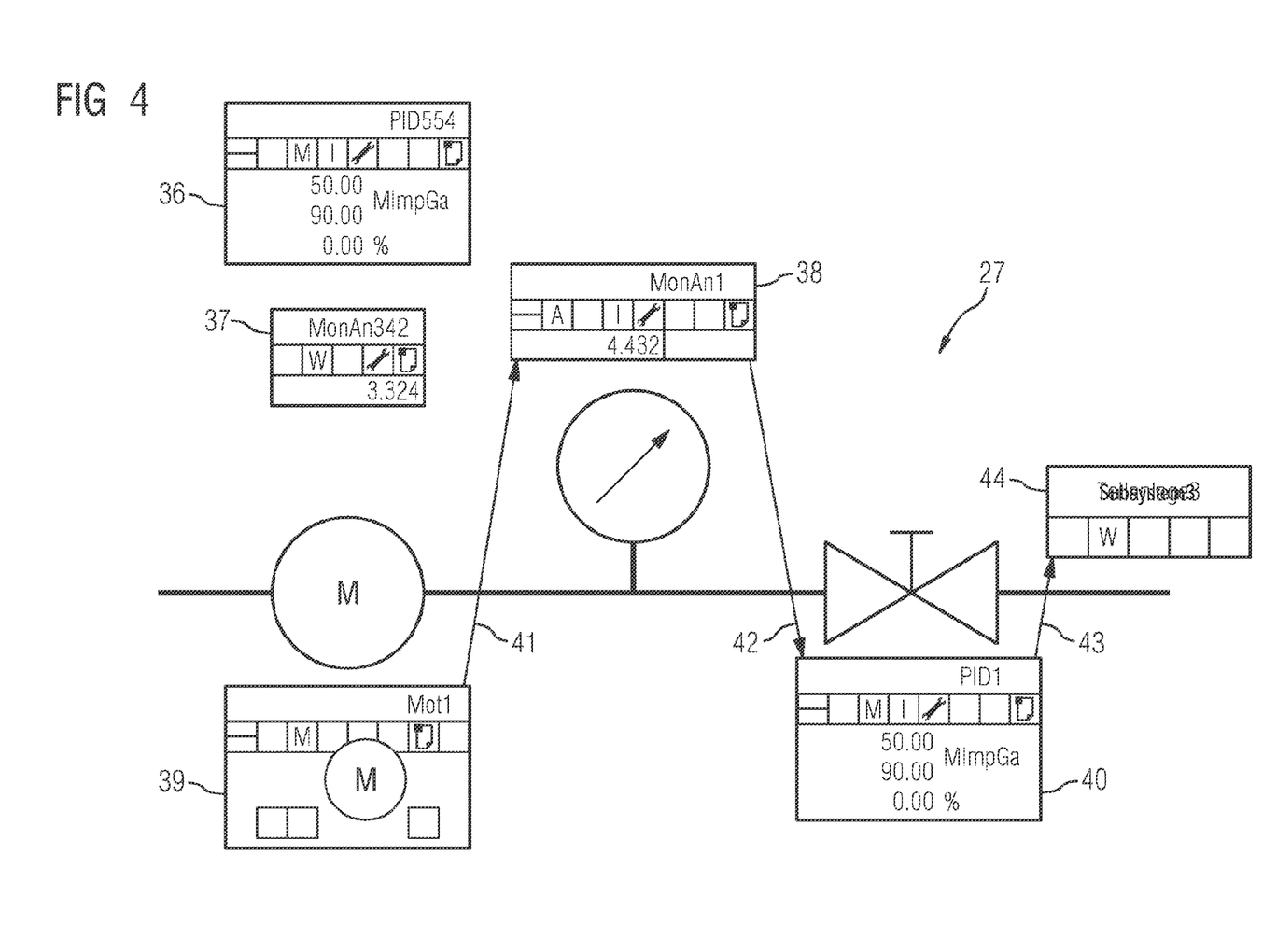
FIG. 4 shows the system image of FIG. 3 in a revised configuration.

For this purpose, the process engineering data flow was visualized by directional arrows 41, 42, 43, where the color of the arrow (not visible here) corresponds to the alarm class color of the highest-priority alarm along the process engineering string. As the process engineering string continues in a further system image 45 (see, e.g., FIGS. 5 and 6), a display reference 44 (an "image change button", referred to as "subsystem 3") has also been inserted. The display reference 44 contains a list of the alarms of the process objects, the block symbols 46, 47, 48 of which are located in the further system image 45.

Figure 5:
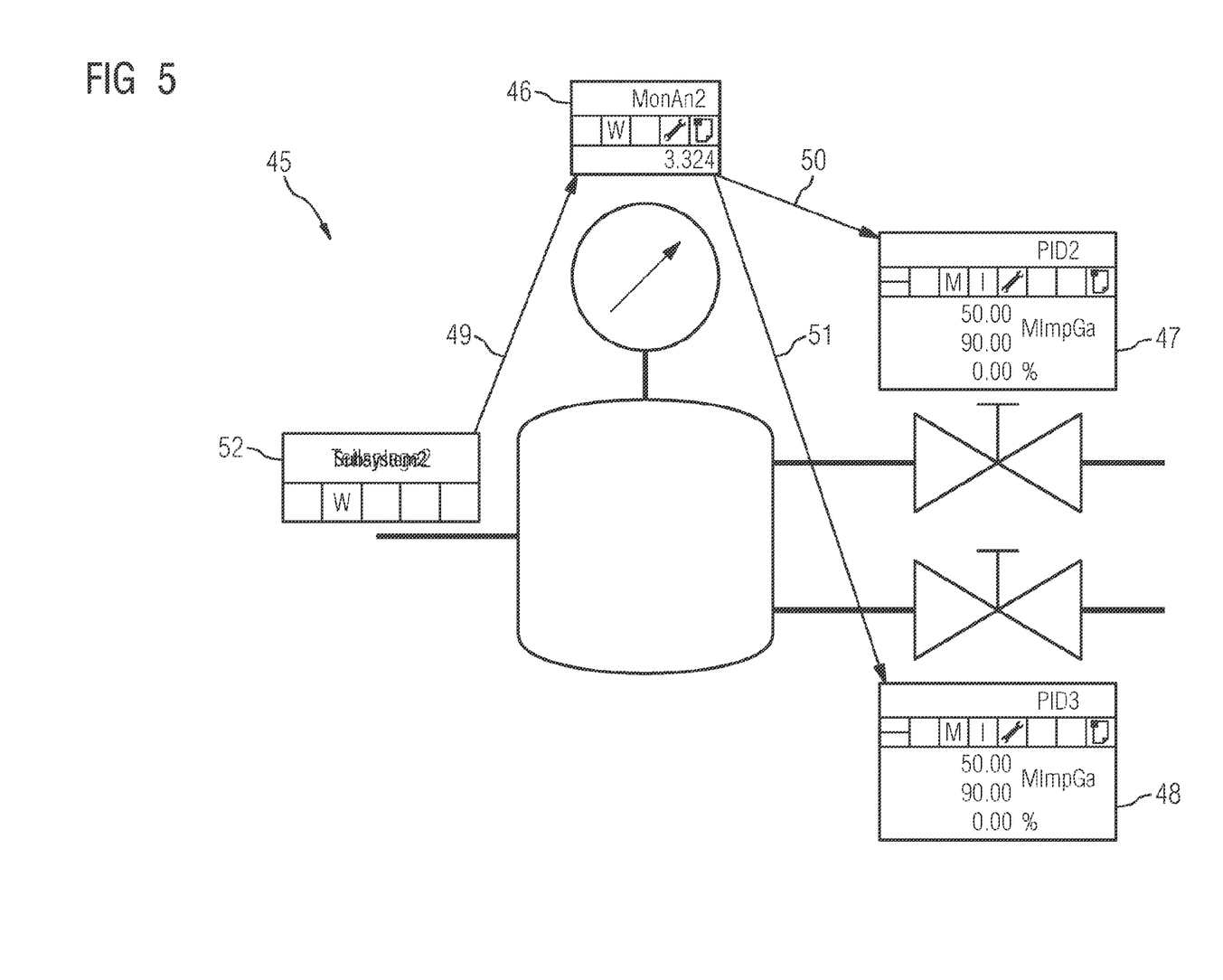
FIG. 5 shows a second system image of the process engineering plant in accordance with the invention.

FIG. 5 shows an exemplary further system image 45 of the third subsystem 3 from FIG. 1 with block symbols 46, 47, 48 that relate to the technical objects of the third subsystem 3 from FIG. 1. A first block symbol 46 corresponds to the second pressure sensor 11, a second block symbol 47 corresponds to the second discharge valve 12 and a third block symbol 48 corresponds to the third discharge valve 13.

Analogously to FIG. 4, the previously determined process engineering data flow is also visualized in FIG. 5 by directional arrows 49, 50, 51. In addition, the system image 45 from FIG. 5 has a display reference 52 ("subsystem 2") which enables a change to the system image 27 and a listing of the alarms of the process objects whose block symbols 38, 39, 40 are located in the system image 27 according to FIG. 4.

In order to arrive directly at the source of one of the display references 44, 52, the operator can also directly select the alarm status in the display references 44, 52. The representation of the process engineering string in the system images 27, 45 can also be deactivated again by the operator.

Although the invention has been illustrated and described in more detail by the preferred exemplary embodiment, the invention is not limited by the disclosed examples and other variations can be derived therefrom by a person skilled in the art without departing from the scope of protection of the invention.

Thus, while there have been shown, described and pointed out fundamental novel features of the invention as applied to a preferred embodiment thereof, it will be understood that various omissions and substitutions and changes in the form and details of the the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An operator station server of a control system of a process engineering plant, the server comprising:
   a computer-implemented process image comprising, at runtime of the process engineering plant, a first computer-implemented process object, a second computer-implemented process object and further computer-implemented process objects, which are each assigned to a technical object of the process engineering plant and are operatively connected to the technical object; and
   a visualization service which is configured to transmit a symbolic system image to an operator station client for visualization, and configured to display block symbols generated from the first process object and the second process object in the system image;
   wherein the first process object includes a structured and direction-oriented reference to the second process object, the direction-oriented reference comprising values derived from Continuous Functional Chart (CFC) plans during an engineering phase and loaded into configurations of the operator station server;
   wherein the visualization service is configured to utilize the structured and direction-oriented reference to determine, via a first software component of the visualization service, a dependency of block symbols generated from the first process object and the second process object in the symbolic system image to derive a process engineering string for the system image;
   wherein the visualization service is further configured to also include further process objects for the derivation of the process engineering string, of which no block symbols are displayed in the system image, system images in which the further process objects are present being determined for the further process objects; and
   wherein the visualization service is further configured to calculate and update alarms for all block symbols and, with the determined system images and alarms at runtime, configured to create image change buttons in the currently opened system image so as to navigate from system image to system image along the derived process engineering string.

2. The operator station server as claimed in claim 1, wherein information is stored about a type of operative connection between two technical objects assigned to the first process object and the second process object.

3. The operator station server as claimed in claim 1, wherein besides a reference to the second process object, the first process object includes further references to further process objects;
   wherein the process objects are each assigned to a technical object of the process engineering plant and are operatively connected to the technical object;
   wherein the technical objects assigned to the further process objects are operatively connected to the technical object assigned to the first process object; and
   wherein information is assigned to the first process object about how many references the first process object has to the further process objects.

4. The operator station server as claimed in claim 1, wherein the operator station client is configured to receive visualization information from the operator station server during runtime of the process engineering plant to visually display at least the first process object and the second process object and the operative connection between the two technical objects assigned to the first process object and the second process object as system images.

5. The operator station server as claimed in claim 1, wherein the operator station client is configured to receive visualization information from the operator station server during runtime of the process engineering plant to visually display at least the first process object and the second process object and the operative connection between the two technical objects assigned to the first process object and the second process object as symbolic system images;
- wherein the operator station client is configured, during the runtime of the technical plant, to generate at least one first symbolic system image which comprises at least one block symbol belonging to the first process object, and one second symbolic system image which comprises at least one block symbol belonging to the second process object;
- wherein the first system image includes a display reference to the second system image, and the second system image includes a display reference to the first system image; and
- wherein an operator of the process engineering plant can alternate between a display of the first and second system images by selecting a respective display reference.

6. A control system for a process engineering plant having at least one operator station server as claimed in claim 1.

* * * * *